B. RICHARDSON.
DEVICE FOR SUSPENDING BOWLS AND THE LIKE.
APPLICATION FILED OCT. 8, 1920.
1,419,307.
Patented June 13, 1922.
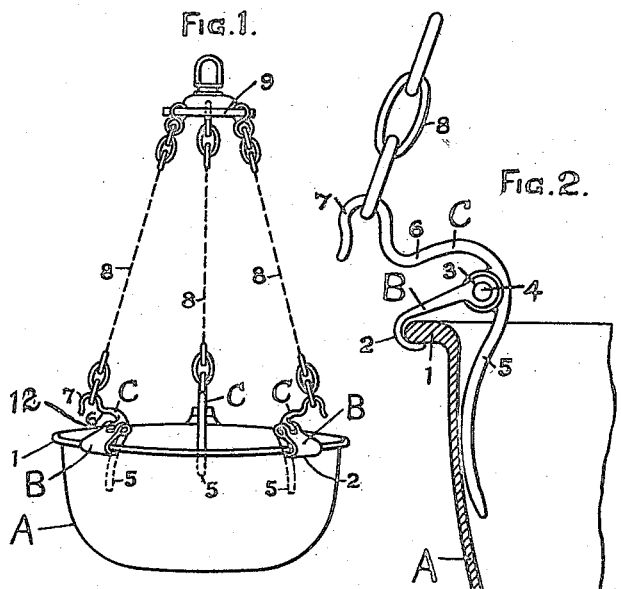
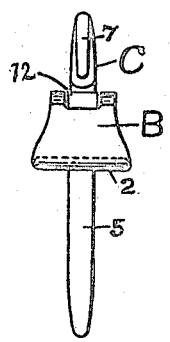
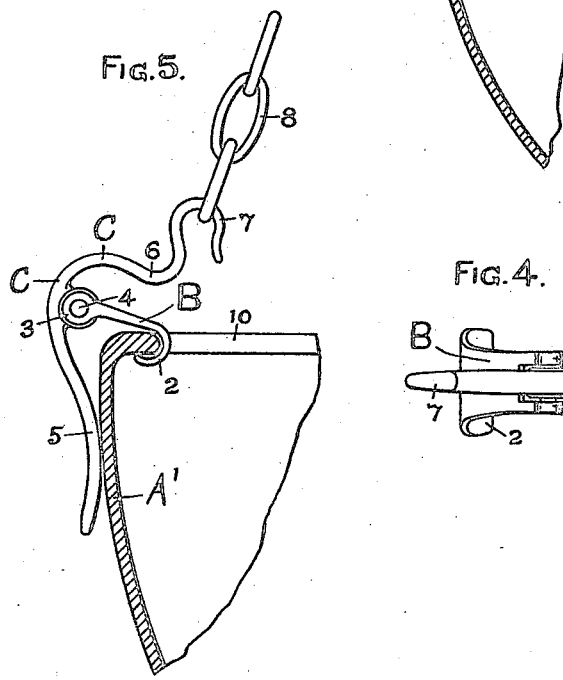
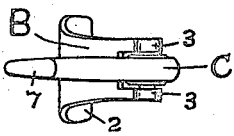
INVENTOR:
Benjamin Richardson
By Wm Wallace White
ATTY.

UNITED STATES PATENT OFFICE.

BENJAMIN RICHARDSON, OF STOURBRIDGE, ENGLAND.

DEVICE FOR SUSPENDING BOWLS AND THE LIKE.

1,419,307.

Specification of Letters Patent. Patented June 13, 1922.

Application filed October 8, 1920. Serial No. 415,521.

*To all whom it may concern:*

Be it known that I, BENJAMIN RICHARDSON, a subject of His Majesty the King of Great Britain and Ireland, residing at Wordesley Glass Works, Stourbridge, England, have invented new and useful Improvements in a Device for Suspending Bowls and the like, of which the following is a specification.

This invention has reference to improved means for suspending bowls, shades and the like for electric or gas or oil or other lights, the object of my invention being to provide simple and efficient means whereby the suspension chains or the like can be readily connected to or disconnected from the rim of a bowl, shade or the like without employing any set screws or metallic ring as is usual. Moreover my suspension means will suit bowls, shades or the like of various diameters.

According to my invention each of the suspension chains or the like (of which there are usually three for each bowl, shade or the like) is provided at its lower end with an attachment device which is formed essentially of two members, one of which has a hook shape and engages with the internal or external rim of the bowl, shade or the like, and the other member is a two armed lever jointed to the upper portion of the hook member, one of the arms of the lever member being adapted to bear against the side or other part of the bowl, shade or the like, whilst the other arm of said member is connected to the end of the suspension chain so that the weight of the bowl, shade or the like acting on the end of the hook and through it on to the fulcrum of the two armed lever member causes one arm of the two armed lever member to press against the bowl or shade so that the hook member is secured in proper engagement with the rim of the bowl, shade or the like.

On the accompanying drawings—

Fig. 1 is a perspective view of an electric light bowl made with an external rim and suspended by three chains which are connected to the bowl by attachment devices constructed in accordance with this invention;

Fig. 2 is a side elevation of the attachment device together with a portion of the suspending chain and showing in cross section a portion of the bowl;

Fig. 3 is a front elevation of the attachment device;

Fig. 4 is a plan of the same, and

Fig. 5 is a side elevation of the same attachment device and a portion of the suspending chain applied to a bowl or shade (a portion of which is shown in section) of the kind which has an internal rim.

Referring firstly more particularly to Figs. 1 to 4 inclusive, A is the bowl which has an outstanding rim 1 and B is the hook member which is made with a comparatively wide hook end 2 adapted to engage underneath the rim 1 of the bowl over which rim the other end 3 of the hook member projects, and this end 3 has a journal which is forked or bifurcated and is jointed by a transversely extending pivot member 4 to the two armed lever member C which is situated between the journaled end of the hooked member B. This transversely extending pivot member is carried by an outwardly extending lug 12 on the lever C and intermediate the ends thereof. One arm, namely the arm 5, of the lever member C projects downwardly and is curved and adapted to bear against the inner surface of the bowl A at a short distance below the rim 1 of the same, and the other arm 6 of the two armed lever C projects upwardly and outwardly at right angles to the first mentioned arm and is hooked at 7, or made as an eye, so as to be connected to the end of one of the three chains 8 by which the bowl is suspended from a central fitting 9. It will be seen that the pull of the chain on the two armed lever C tends to press the one arm 5 of the lever member C against the inner side of the bowl A and to cause the hook member B which is pivotally supported by the pivot member on the lever at the same side as the arm 6 of the lever to properly engage underneath the rim 1 of the bowl and thus to be properly secured thereto. When it is desired to remove the bowl it is only necessary to raise the bowl slightly and then the hook members B can readily be turned out of engagement with the rim 1.

The same device can be similarly used with bowls such as A¹, Fig. 5, which are made with an internal rim such as 10, but in this case the lever C is as shown in this figure situated outside the bowl with its lower arm 5 bearing against the outer side of the bowl while the hook member B engages under the internal rim 10.

What I claim as my invention and desire to secure by Letters Patent is:—

1. A device of the character described, comprising two members pivoted together, one of said members being hooked to engage the rim of a bowl and the other of said members being bent to form a two-armed lever having one arm projecting below the pivotal point and adapted to bear against the surface of the bowl, and the other arm projecting substantially at right angles to the first-mentioned arm and adapted to be connected to suspension means, a transversely extending pivot member upon the said two-armed lever and intermediate the ends thereof, and a journal on the end of the hooked member opposite to that having the hook thereon and adapted to pivotally support the hooked member on the same side of the two-armed lever as the second mentioned arm.

2. A device of the character described, comprising two members pivoted together, one of said members being hooked to engage the rim of a bowl and the other of said members being bent to form a two-armed lever having one arm projecting below the pivotal point and adapted to bear against the surface of the bowl and the other arm projecting substantially at right angles to the first-mentioned arm and having a hooked end to receive the suspension means, an outwardly extending lug upon the two-armed lever and intermediate the ends thereof, a transversely extending pivot member carried by the said lug, and a journal on the end of the hooked member opposite to that having the hook thereof and adapted to engage with the pivot member on the lever to pivotally support the hooked member on the same side of the lever as the second mentioned arm.

In testimony whereof I have signed my name to this specification.

BENJAMIN RICHARDSON.